United States Patent [19]

Flores

[11] Patent Number: 4,746,187
[45] Date of Patent: May 24, 1988

[54] KINK-FREE FIBER OPTIC CABLE CONNECTOR

[75] Inventor: Arnold Flores, San Diego, Calif.

[73] Assignee: The United States of America as represented by the Secretary of the Navy, Washington, D.C.

[21] Appl. No.: 784,969

[22] Filed: Oct. 7, 1985

[51] Int. Cl.⁴ ............................................. G02B 6/36
[52] U.S. Cl. ............................. 350/96.20; 350/96.23
[58] Field of Search ............... 350/96.20, 96.21, 96.22, 350/96.23

[56] References Cited

U.S. PATENT DOCUMENTS

| | | | |
|---|---|---|---|
| 3,871,744 | 3/1975 | Bridger et al. | 350/96.21 |
| 4,171,867 | 10/1979 | Cocito | 350/96.21 |
| 4,185,886 | 1/1980 | Corrales | 350/96.21 |
| 4,379,614 | 4/1983 | Liertz | 350/96.21 |
| 4,396,248 | 8/1983 | Bientz et al. | 350/96.21 |
| 4,405,200 | 9/1983 | Hoffmann et al. | 350/96.21 |
| 4,428,645 | 1/1984 | Korbelak et al. | 350/96.20 |
| 4,478,487 | 10/1984 | Obeissart | 350/96.21 |

FOREIGN PATENT DOCUMENTS

| | | | |
|---|---|---|---|
| 54-7357 | 1/1979 | Japan | 350/96.21 |
| 57-73710 | 5/1982 | Japan | 350/96.20 |

OTHER PUBLICATIONS

Dalgleish et al, "Test Methods . . . Optical Fiber Connector," *Proc. of 30th Int. Wire & Cable Symp.*, Cherry Hill, N.J., Nov. 1981, pp. 445-453.

*Primary Examiner*—John Lee
*Attorney, Agent, or Firm*—Robert F. Beers; Ervin F. Johnston; Thomas Glenn Keough

[57] ABSTRACT

A kink-free fiber optic cable connector is provided for a cable having a plurality of optical fibers and strength wires. The connector includes a first connector body for receiving the fiber optic cable and clamping the strength wires thereof, and a second connector body for receiving the optical fibers. A plurality of rods interconnect the first and second connector bodies in a substantially aligned spaced relationship. A transverse member is mounted on the rods between the first and second connector bodies and has peripheral recesses, each recess being capable of receiving a respective optical fiber. Lengths of the optical fibers are retained in the recesses and looped around the rods between the first and second connector bodies to minimize strain on the optical fibers.

2 Claims, 1 Drawing Sheet

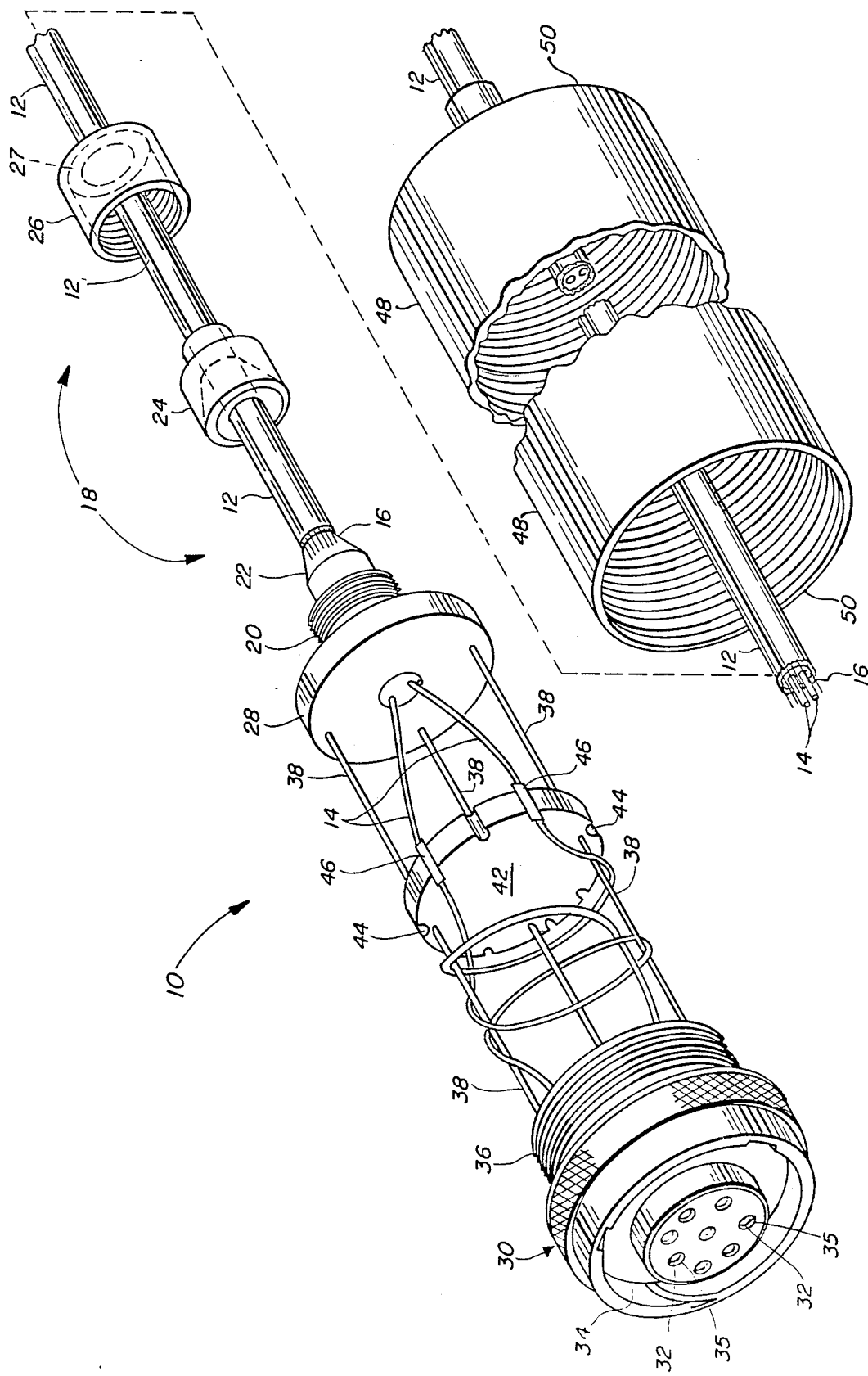

KINK-FREE FIBER OPTIC CABLE CONNECTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a kink-free connector for a fiber optic cable of the type having a plurality of optical fibers and strength wires.

State-of-the-art fiber optic cable connectors provide connector bodies which are joined together in close proximity. The joining of the optical fibers and the subsequent assembly of the connector bodies results in undue strain on the optical fibers within the connector bodies. The more optical fibers that are joined within the connector bodies the greater the strain problem becomes. When the optical fibers are joined together, the connector bodies obviously have to be spaced apart so that the joining operation can be performed. When the connector bodies are connected together, the slack in the optical fibers takes the paths of least resistance, but the fibers are subject to serious kinking problems because of the lack of direction to their paths. A kink in any optical fiber often results in at least a partial break of this fiber or its cladding to comprise its effectiveness.

SUMMARY OF THE INVENTION

The present invention overcomes the aforementioned problems associated with prior art connectors by providing a kink-free connector for a fiber optic cable. This is accomplished by providing a first connector body for receiving the fiber optic cable and clamping the strength wires thereof, and a second connector body for receiving the optical fibers of the cable. A plurality of rods interconnect the first and second connector bodies in a substantially aligned spaced relationship. A transverse member is mounted on the rods between the first and second connector bodies and has peripheral recesses, each recess being capable of receiving a respective optical fiber. With this arrangement the optical fibers can be retained in the recesses and then looped around the rods between the first and second connector bodies so as to minimize strain on the optical fibers.

OBJECTS OF THE INVENTION

An object of the present invention is to overcome the aforementioned problems associated with prior art fiber optic cable connectors.

Another object is to provide a fiber optic cable connector which prevents kinks of optical fibers joined therein.

Another object is to provide a fiber optic cable connector which enables sufficient access to optical fibers of the cable for their joining, and yet prevents kinking of these optical fibers when the connector is fully assembled.

These and other objects of the invention will become more readily apparent from the ensuing specification when taken together with the drawings.

DESCRIPTION OF THE DRAWING

The FIGURE is an isometric exploded view of the kink-free fiber optic cable connector with the fiber optic cable and with portions broken away to illustrate various details thereof.

DESCRIPTION OF THE PREFERRED EMBODIMENT

Referring now to FIG. 1 there is illustrated a kink-free fiber optic cable connector 10 for a cable 12 of the type which has a plurality of optical fibers 14, only two of which are shown in FIG. 1, and strength wires 16. The connector includes a first connector body means 18 for receiving the fiber optic cable and clamping the strength wires thereof. The first connector body means may be the standard strain relief apparatus for a cable of the type which includes an externally threaded sleeve 20 and mandrel 22 which may be separate or connected to the sleeve 20 as illustrated in FIG. 1A wedge 24 is provided for wedging strength wires 16 to mandrel 22 when a nut 26 having a shoulder 27 is threaded on sleeve 20. This coaction causes a binding of strength wires 16 between mandrel 22 and wedge 24. Threaded sleeve 20 may be provided with a flange 28 for a purpose to be explained hereinafter.

A second connector body means 30 is provided for receiving the optical fibers 14 of the cable. The optical fibers may terminate in this body means 30 at 32 where these ends are polished for connection to mating optical fiber ends in a similar connector body means (not shown). Connector body means 30 may be connected to said similar connector body means (not shown) by a bayonet connection within recess 34. The optical fibers 14 may be retained within the connector body means 30 by tubes 35 which are press fitted within longitudinal passageways within connector body means 30. The end of the connector body means opposite from the polished ends 32 of the optical fibers may be provided with a reduced diameter threaded annular body portion 36 for a purpose to be explained hereinafter.

A plurality of rods 38 interconnect the first and second connector body means 18 and 30 in a substantially aligned spaced relationship. The rods are connected at one of their ends to flange 28 of threaded sleeve 20, and are connected at their other ends to the end of annular body portion 36 of second connector body means 30. In the preferred embodiment three rods 14 are utilized, and are preferably spaced from one another at least 90° apart.

A transverse disc-like member 42 is mounted on the rods 38 between the first and second connector body means 18 and 30. Transverse disc 42 may be provided with peripheral recesses 44. The disc may be mounted on rods 38 by having the rods extend through the body of the disc, as illustrated in FIG. 1. Disc 42 may be fixed in place to rods 38 by any suitable means, such as with epoxy, but in the preferred embodiment the disc is slidably mounted on the rods so that adjustments can be made in the lengths of fibers 14 on both sides of the disc. Means may be provided for retaining the optical fibers within recesses 44. An exemplary retention means may be a roll of sheet rubber 46 wrapped around each fiber and press fitted within a respective disc recess 44.

Fiber optic cable 12 extends into first connector body means 18 wherein strength wires 16 are securely retained for strain relief. Thence optical fibers 14 extend to the recesses 44 of the disc 42 where they are retained. The optical fibers are wound around the outside of the plurality of rods 38 between disc 42 and second connector body means 30 and the end portions of optical fibers 14 are retained within the second connector body means 30 by the sleeves 35 with the ends of the optical fibers terminating and having polished surface ends 32. It has been found that a simple single loop of each optical fiber 14 about rods 38 is sufficient to provide the extra length of optical fiber necessary for facilitating joining of the optical fibers between the first and second connector body means. The joining of optical fibers 14 between the first and second connector body means may be at any place therebetween; however, in the preferred embodiment the joining is made at a place where the joint can be easily wrapped with rubber 46 and placed within one of the recesses 44 of the disc 42. This will keep the optical fiber joint in a retained straight relationship so as to minimize undue strain on the joint. In the preferred embodiment disc 42 can be conveniently moved along the rods between first and second connector body means 18 and 30 so as to conveniently position the optical fibers so as to minimize strain thereon. A housing 48 with internal threads 50 for engagement with external threads 36 of connector body portion 30 may be provided for containing exposed components of kink-free connector 10. When housing 48 is threaded onto second body connector means 30 it will contain cable 12, entire first connector body means 18, transverse disc 42, optical fibers 14, and rods 38.

Obviously, many modifications and variations of the present invention are possible in the light of the above teachings. It is therefore to be understood that within the scope of the appended claims the invention may be practiced otherwise than as specifically described.

What is claimed is:

1. A kink-free fiber optic cable connector for a cable having a plurality of optical fibers and strength wires comprising:

first connector body means for receiving the fiber optic cable and clamping the strength wires thereof;

second connector body means for receiving the optical fibers of the cable;

a plurality of rods interconnecting the first and second connector body means in a substantially aligned spaced relationship for receiving the optical fibers;

a transverse member mounted on the rods between the first and second connector body means provided with peripheral recesses each sized to receive a respective optical fiber to allow each fiber to be appropriately looped around the rods without kinks between the first and second connector body means for minimizing strain on and kinking of the optical fibers, the optical fibers are disposed in the recesses of the transverse member and are wound around the rods between the first and second connector body means;

means for retaining the optical fibers in the recesses of the transverse member; and a housing threaded on the second connector body means and containing the first connector body means, the plurality of rods, and the transverse member.

2. In a connector for a fiber optic cable having a plurality of optical fibers and strength wires, an improvement comprising:

first means for receiving the fiber optic cable and clamping the strength wires;

second means for receiving the optical fibers;

a plurality of rods extending longitudinally within the connector between the first and second receiving means; and a transversely extending member mounted on the rods intermediate the rod ends, the transversely extending member is provided with peripheral recesses each capable of receiving and retaining an optical fiber and allowing it to be looped around the rods for minimizing strain and kinking thereof, the optical fibers of the cable are disposed in recesses of the transverse member and are wound around the rods between the first and second receiving means;

means retaining the optical fibers in the recesses of the transversely extending member; and a housing threaded on the second receiving means and containing the cable, the first receiving means, the transversely extending member, the optical fibers, and the rods.

* * * * *